United States Patent [19]

Nasu

[11] 4,305,093
[45] Dec. 8, 1981

[54] METHOD OF PRODUCING MULTIPLE IMAGES IN A SCANNING APPARATUS

[75] Inventor: Minoru Nasu, Sakai, Japan

[73] Assignee: International Electronic Photo Process Laboratory Co., Ltd., Tokyo, Japan

[21] Appl. No.: 46,456

[22] Filed: Jun. 7, 1979

[30] Foreign Application Priority Data

Jun. 22, 1978 [JP] Japan .................................. 53-76209
Jun. 24, 1978 [JP] Japan .................................. 53-75982

[51] Int. Cl.³ ............................................. H04N 1/46
[52] U.S. Cl. ...................................... 358/75; 358/78; 358/287; 358/77; 358/80
[58] Field of Search .................. 358/75, 77, 78, 80, 358/280, 286, 287, 292

[56] References Cited

U.S. PATENT DOCUMENTS

| | | | |
|---|---|---|---|
| 3,402,278 | 4/1968 | Dermbach | 219/69 |
| 3,541,245 | 11/1970 | Wilby | 358/280 |
| 3,878,559 | 4/1975 | Pugsley | 358/78 |
| 4,127,870 | 11/1978 | Colditz | 358/77 |

Primary Examiner—Robert L. Richardson
Assistant Examiner—Edward L. Coles
Attorney, Agent, or Firm—McAulay, Fields, Fisher, Goldstein & Nissen

[57] ABSTRACT

An available storage area of a store is divided into a plurality of storage sections, each having an equal storage capacity and the number of the storage sections being equal to the number of images to be produced, and multiple digital image signals obtained by optoelectrically scanning one scanning line of at least one original are simultaneously stored in the respective storage sections in parallel. The stored multiple digital image signals are extracted, in series, from the store by sequentially accessing the entire available storage area, regardless of the storage sections. Thereafter, one line of an output surface is electro-optically treated in accordance with the extracted multiple image signals to serial multiple images of one scanned line of the original, along the direction of the scanning line. A series of the abovementioned operations, from the storing operation to the treating operation, are repeated in succession until all the lines of the output surface are treated.

7 Claims, 12 Drawing Figures

Fig. 11

# METHOD OF PRODUCING MULTIPLE IMAGES IN A SCANNING APPARATUS

BACKGROUND OF THE INVENTION

The present invention relates to a method of producing images in a scanning apparatus. More particularly, the invention relates to an image producing method in which one-line components of multiple images can be obtained by one scanning operation.

As the conventional image producing means of obtaining one-line components of multiple images by one scanning operation, there is known a colour scanner for producing a plurality of colour separation images from a coloured original. In this conventional colour scanner, a coloured original to be reproduced is optically scanned and colour-separated to obtain a plurality of colour separation image signals indicating densities of respective colour components, and these colour separation image signals are separately stored in independent memory units. An exposing drum disposed on the image-reproducing side, on which a film to be exposed is wrapped, is circumferentially divided into equal sections. The number of the divided sections corresponds to the number of the above-mentioned colour separation image signals. Every time an exposing head passes through each boundary between adjacent division sections a section signal is produced, and the memory units for reading out the colour separation image signals are switched over in sequence in response to the so produced section signals. As a result, a plurality of images are produced along the circumferential direction of the exposing drum by the continuous scanning operation of the exposing head.

The first defect of this conventional technique is that, since each colour separation image signal is read out from the corresponding memory unit in response to the section signal, if the timing of production of the section signal is not in agreement with the timing of initiation of scanning, shear is caused in the produced images, and if the quantity of such shear is changed with the lapse of time, jitters occurs in the produced images.

The second defect of the above-mentioned conventional technique is that, since the memory units are arranged so that one memory unit is to store one kind of a colour separation image signal, it is impossible to produce images in a number larger than the predetermined number of the memory units disposed, and if the number of images produced is smaller than said predetermined number of the memory units, some of the memory units are not used for the reproduction and the storage capacity of the entire memory system is not effectively utilized.

SUMMARY OF THE INVENTION

It is, therefore, a primary object of the present invention to provide a method of producing a plurality of images which can produce high quality images free of jitter.

Another object of the present invention is to provide a method of producing a plurality of images in which the storage capacity of the memory system can be effectively utilized.

According to the image producing method of the present invention, an available storage area of a store is divided into a plurality of storage sections, each having an equal storage capacity, and the number of the storage sections are equal to the number of images to be produced, and a plurality of digital image signals, obtained by opto-electrically scanning one scanning line of at least one original, are simultaneously stored in the respective storage sections in parallel. A plurality of the stored digital image signals are extracted, in series, from the store by sequentially accessing the entire available storage area, regardless of the storage sections. Thereafter, one line of an output surface is electro-optically treated in accordance with a plurality of the digital image signals extracted from the store, to form multiple images of one scanned line of the original along the direction of the scanning line. A series of the abovementioned operations, from the storing operation to the treating operation, are repeated in succession until all the lines of the output surface are treated.

When digital image signals are taken out from the store, the storage area is accessed in succession. Accordingly, in the method of the present invention, formation of jitter caused by deviation of the changeover timing in the memory units with the conventional technique can be completely prevented, and therefore, good quality images can be obtained.

Moreover, according to the present invention, since the storage area of the store is divided into equal sections in a number corresponding to the number of images to be produced, the storage capacity can be effectively utilized.

DETAILED DESCRIPTION OF THE PREFERRED EMBODIMENT

Figure 1:
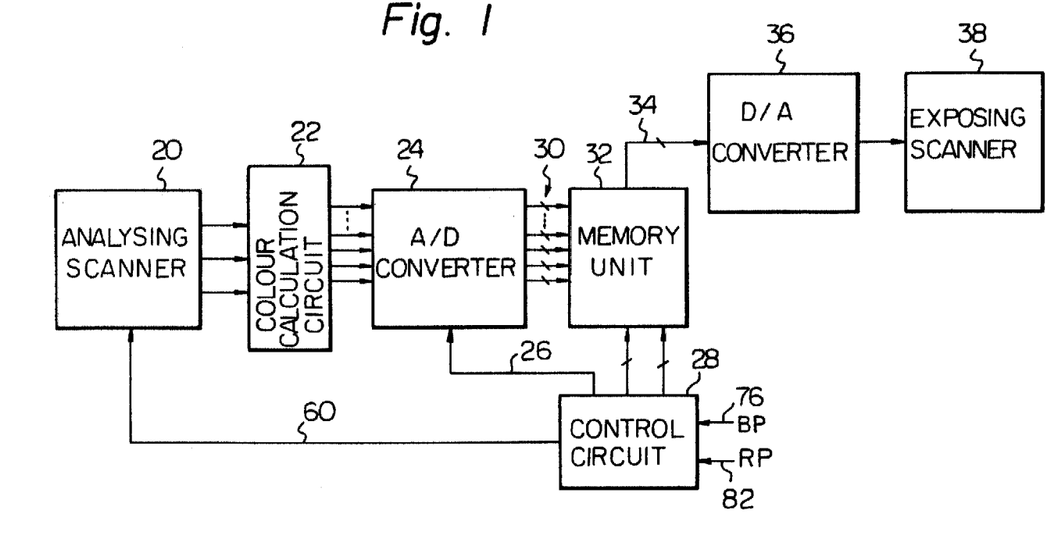
FIG. 1 is a block diagram schematically illustrating one embodiment of the method of the present invention.

FIG. 1 is a block diagram illustrating in broad outline one preferred embodiment of the present invention, in which a colour scanner for preparing printing plates is used for obtaining a plurality of colour separation images from a coloured original. In FIG. 1, reference numeral 20 represents an analysing scanner for optically scanning a coloured original, for separating an optical signal obtained by this scanning operation into a plurality of colours by using a plurality of optical filters and for converting optical signals of the respective separated colour components to electrical colour component signals having electrical levels indicating the densities of a colour component, respectively. A colour calculation circuit 22 carries out various colour calculations on the colour component signals sent from the analysing scanner 20 and forms analog image signals corresponding to the respective colour separation images for reproduction of the coloured original. Such colour calculations carried out in a colour calculation circuit of this type are known as colour correction, tone control, density compression, under colour removal, unsharp control and graduation control. In the colour calculation circuit 22 of the present embodiment, all or some of these calculations are carried out. However, for convenience's sake, the case where the analysing scanner 20 generates three colour component signals, for example, yellow, magenta and cyan colour signals, and the colour calculating circuit 22 simultaneously generates six analog colour separation signals, for example, yellow, cyan, magenta, black, light cyan and light magenta colour separation signals, from these colour component signals generated by the analysing scanner 20, is illustrated in the present embodiment. Therefore, in the present embodiment, the number of colour separation images to be produced is six.

An analog-digital converter 24 (A/D converter) comprises analog-digital converting elements, the number of which is equal to the maximum number of produceable colour separation images, preferably about twelve. In this A/D converter 24, the colour separation signals input to the respective A/D converting elements are simultaneously sampled and digital colour separation signals indicating the densities of the respective separated colours of each picture element are generated. In the present embodiment, one separated colour of one picture element is expressed by a binary signal of eight bits. The sampling operation in the above-mentioned A/D conversion is performed synchronously with input sampling pulses ISP transmitted from a control circuit 28 via a line 26.

The respective digital colour separation signals formed by the A/D converter 24 are transmitted to a memory unit 32 in parallel via connecting lines 30. Each line 30 is composed of lines of eight bits. In the memory unit 32, one word is constructed by eight bits and an address is given for every word. The memory unit 32 is arranged so that all the available storage area of the unit 32 can be equally divided in storage sections, each of which has an equal number of words. The number of such storage sections formed by dividing the entire storage area of the memory unit 32 is made to correspond to the number of colour separation images to be produced. In the present embodiment, since the number of colour separation images to be produced is six, the memory unit 32 is equally divided into six sections. The digital colour separation signals applied to the memory unit 32 are written independently in parallel in the corresponding storage sections. In all the storage sections, a writing operation is simultaneously initiated from an address position corresponding to the lowermost address positions of the respective storage sections and the writing addresses are advanced in sequence in each storage section synchronously with input sampling pulses ISP. One cycle of the writing operation is completed when an address position corresponding to the uppermost address position in each storage section is accessed. One cycle of the writing operation is conducted one time during one scanning operation of the analysing scanner 20 in the direction of the scanning line. Accordingly, when the analysing scanner 20 carries out one scanning operation in the scanning line direction, the digital colour separation signals of a word number corresponding to one scanning line are stored in each storage section of the memory unit 32.

When the data stored in the memory unit 32 are read out therefrom, the storage sections used for the writing operation are completely neglected. More specifically, reading addresses are given in sequence from an address position corresponding to the lowermost address position to an address position corresponding to the uppermost address position in the memory unit 32 throughout the respective storage sections. Accordingly, the digital colour separation signals, each having a word number corresponding to one scanning line, are read out in sequence in a time-sharing manner. The digital colour separation signals read out in sequence from the memory unit 32 are transmitted to a digital-analog converter 36 (D/A converter) through a connection line 34 of eight bits and they are converted in sequence to analog colour separation signals and then transmitted to an exposing scanner 38.

In the memory unit 32, the reading addresses are advanced in sequence synchronously with output sampling pulses OSP, and when an address position corresponding to the uppermost address position of the memory unit 32 is accessed, one cycle of the reading operation is completed. One cycle of the reading operation is conducted one time during one scanning operation of the analying scanner 20 in the direction of the scanning line. Accordingly, when the analysing scanner 20 carries out one scanning operation in the scanning line direction, the respective colour separation signals, that is, six colour separation signals in the present embodiment, are transmitted in sequence for every scanning line to the exposing scanner 38 in a time-sharing manner.

The exposing scanner 38 is disposed to scan the surface of a photosensitive film with an exposure intensity corresponding to the level of each colour separation signal transmitted from the D/A converter 36. One scanning operation of the exposing scanner 38 in the scanning line direction is synchronous with one scanning operation of the analysing scanner 20 in the scanning line direction. Accordingly, by one scanning operation of the exposing scanner 38 in the scanning line direction, a plurality of colour separation images of one scanning line, that is, six colour separation images in the present embodiment, are exposed in series and in sequence on the photosensitive film. The above-mentioned scanning operations of the analysing scanner 20 and exposing scanner 38 are repeated by shifting the scanning line toward the direction vertical to the scanning line direction, whereby a plurality of colour separation images of the coloured original, that is, six colour separation images in the present embodiment, are formed in parallel in the scanning line direction.

The control circuit 28 is disposed to control the write-in and reading addresses and control the area division of the memory unit 32. The control circuit 28 also performs the operation of controlling the moving speed of an analysing head in the analysing scanner 20. The structure and operations of this control circuit 28 will be apparent from the following detailed description of the present embodiment.

Figure 2:
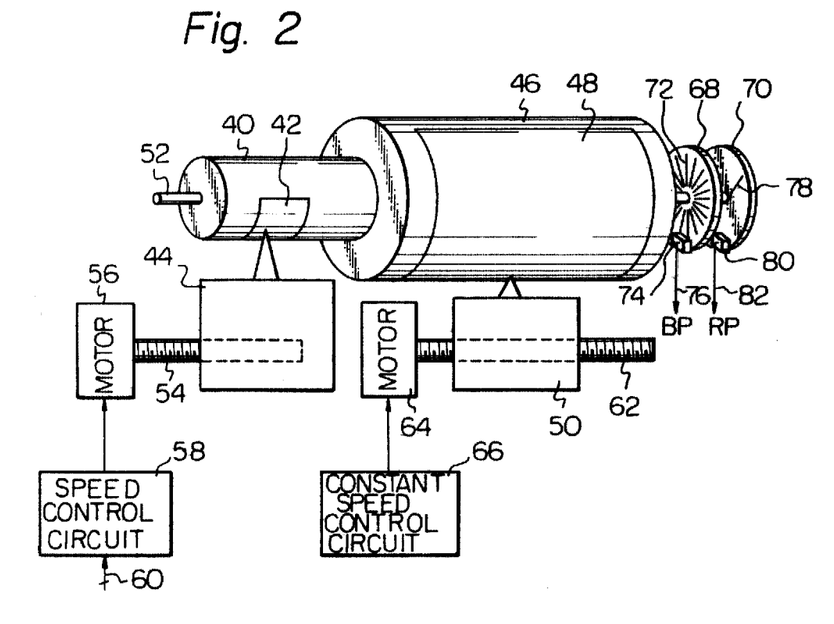
FIG. 2 is a diagram illustrating the mechanical structure of the analysing scanner and exposing scanner in the embodiment illustrated in FIG. 1.

FIG. 2 is a diagram illustrating in detail the analysing scanner and exposing scanner illustrated in FIG. 1. In FIG. 2, reference numeral 40 represents an analysing drum on which a coloured original 42 to be reproduced is wrapped, 44 an analysing head, 46 an exposing drum on which a photosensitive film 48 to be exposed is wrapped, and 50 an exposing head. The analysing drum 40 and exposing drum 46 are fixed to a common shaft 52 so that they are rotated at a predetermined equal angular speed. The diameter of the exposing drum 46 is two times as large as the diameter of the analysing drum 40.

The movement of the analysing head 44 with respect to the axial direction of the analysing drum 40 (hereinafter referred to as "frame direction") is performed by rotation of a lead screw 54. The lead screw 54 is rotated by a motor 56 having the rotational speed controlled by a speed control circuit 58. This speed control circuit 58 controls the rotational speed of the motor 56 according to a signal indicating the ratio of image enlargement or image reduction, which is input from the control circuit 28, illustrated in FIG. 1, via a line 60. Accordingly, the speed of the movement of the analysing head 44, in the frame direction, with respect to the analysing drum 40 is controlled in response to the ratio of image enlargement or image reduction.

The movement of the exposing head 50 with respect to the axial direction of the exposing drum 46 (frame direction) is performed by rotation of a lead screw 62. The lead screw 62 is rotated by a motor 64 having its rotational speed always maintained at a predetermined level by a constant speed control circuit 66. Accordingly, the speed of the movement of the exposing head 50 in the frame direction with respect to the exposing drum 46 is always kept constant.

The analysing head 44 comprises the aforementioned optical filters and opto-electrical converting mechanism. By one rotation of the analysing drum 40 with respect to the analysing head 44, one scanning operation in the scanning line direction is performed, and while the analysing head 44 is being moved in the frame direction with respect to the analysing drum 40, the above scanning operation is repeated, whereby the entire analysing scanning of the original 42 is completed. The exposing head 50 comprises the aforementioned electro-optical converting mechanism, and by one rotation of the exposing drum 46 with respect to the exposing head 50, one scanning operation in the scanning line direction is performed. While the exposing head 50 is being moved in the frame direction with respect to the exposing drum 46, the above scanning operation is repeated, whereby the entire exposing scanning on the photosensitive film 48 is completed.

A basic pulse generating disc 68 and a reset pulse generating disc 70 are coaxially fixed to the shaft 52 of the analysing drum 40 and exposing drum 46. These discs 68 and 70 are rotated at the same angular speed as that of the drums 40 and 46. A plurality of light-transmitting radial slits 72 are formed on the disc 68. In the vicinity of the disc 68, an opto-electrical sensor 74 is disposed to detect light transmitted thereto through the slit 72 and to generate an electrical basic pulse every time each slit 72 passes. This basic pulse BP obtained from the opto-electrical sensor 74 is supplied to the control circuit 28, illustrated in FIG. 1, via a line 76.

This basic pulse BP has a frequency $f_0$ proportional to the rotational speed of the analysing and exposing drums 40 and 46, that is, the scanning speed in the scanning line direction. In the control circuit 28, input sampling pulse ISP and output sampling pulse OSP are formed from this basic pulse BP. One radial slit 78 is formed at a predetermined position of the disc 70. In the vicinity of the disc 70, an opto-electrical sensor 80 is disposed to generate an electrical reset pulse RP every time the slit 78 passes. This reset pulse RP indicates the timing at which the standard positions of the drums 40 and 46 confront the heads 44 and 50, that is, the timing for initiating the scanning operation in the scanning line direction. This reset pulse RP is supplied to the control circuit 28, illustrated in FIG. 1, via a line 82.

Figure 3A:
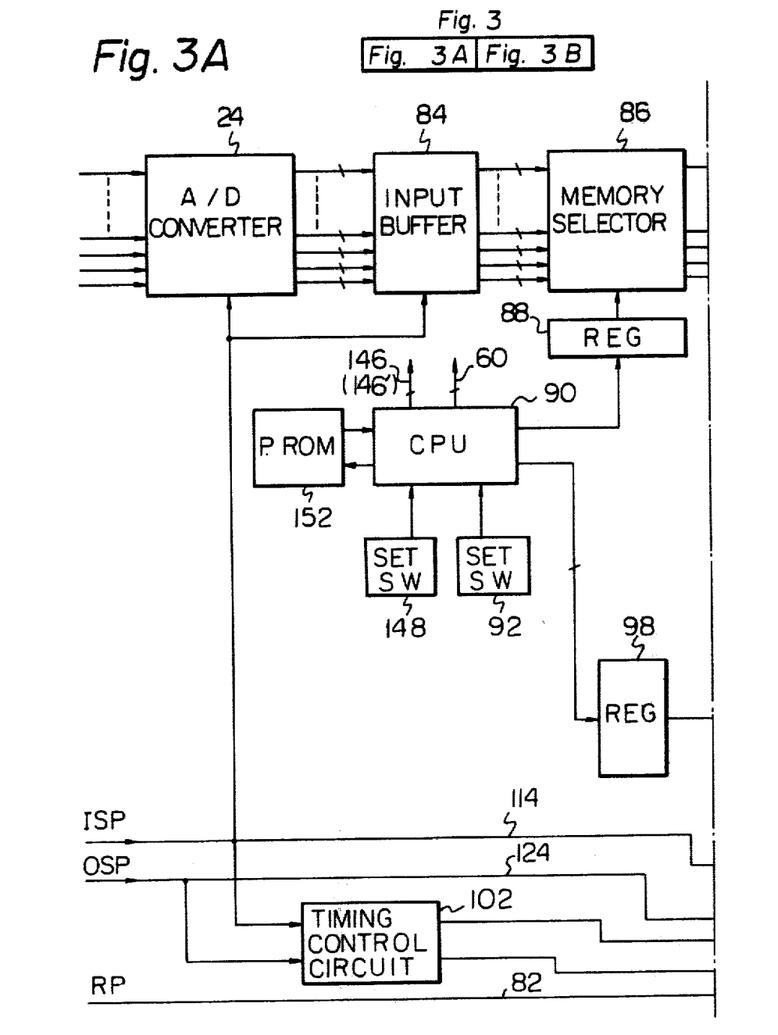
FIG. 3 comprised of 3A and 3B is a block diagram illustrating in detail the structure of the A/D converter, memory unit, D/A converter and control circuit in the embodiment illustrated, in FIG. 1.
Figure 3B:
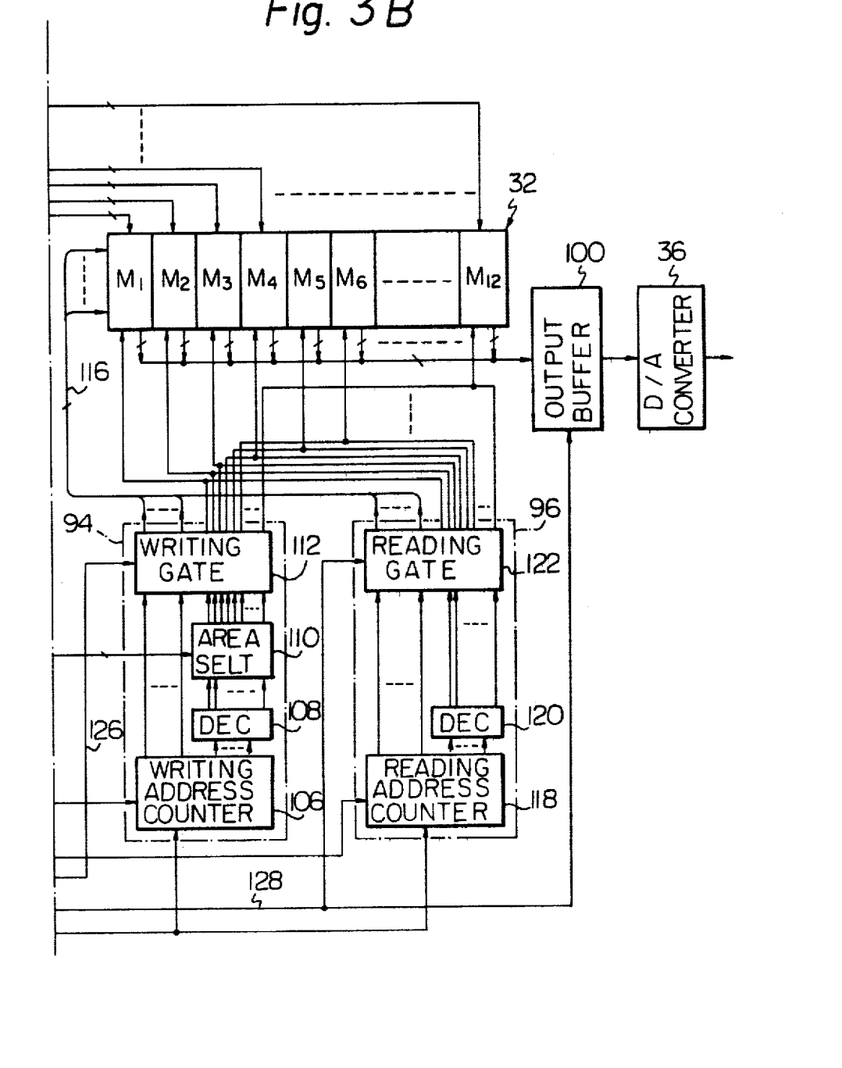

FIG. 3 illustrates in detail the structure of the portion of the embodiment of FIG. 1 including the A/D converter 24, memory unit 32, D/A converter 36 and control circuit 28. In FIG. 3, reference numeral 84 represents an input buffer having a one-word capacity for each channel of the colour separation signals, so as to regulate the writing timing of the memory unit 32, 86 a memory selector for equally dividing the storage area of the memory unit 32 into equal storage sections, and 88 a register of twenty one bits for the memory selector 86. Futhermore, in FIG. 3, reference numeral 90 represents a central processing unit (CPU), 92 an image number setting switch for setting the number of colour separation images to be produced, 94 a writing control unit, 96 a reading control unit, 98 a register of twenty eight bits for an area select gate 110 in the writing control unit 94, 100 an output buffer, and 102 a writing and reading timing control circuit for staggering the timing of one of the writing and reading operations when both the operation of writing data in the memory unit 32 and the operation of reading the data therefrom simultaneously take place.

Figure 4:
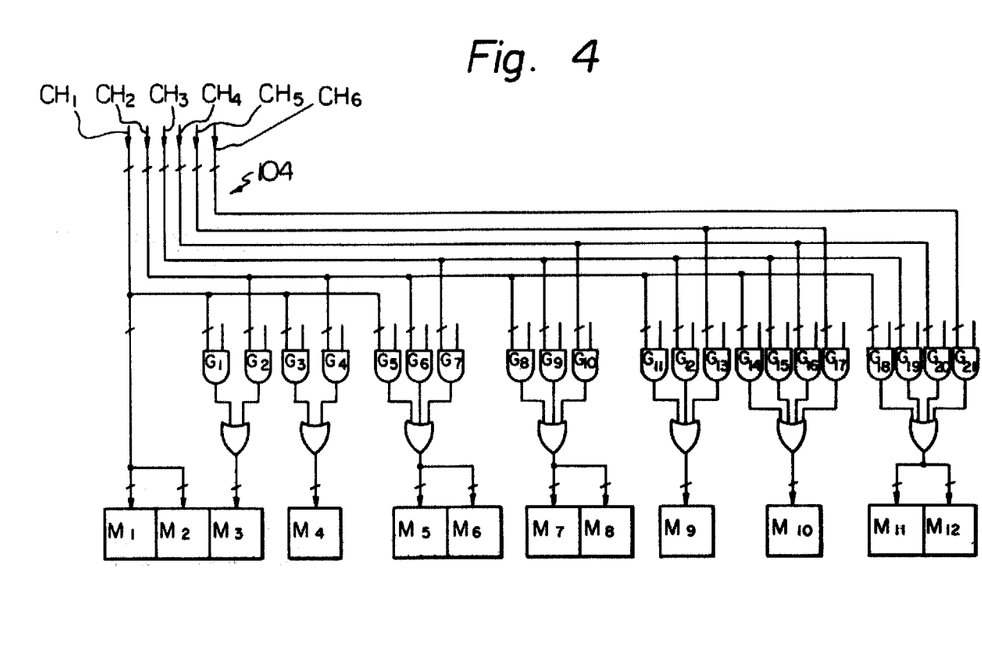
FIG. 4 is a circuit diagram illustrating in detail the memory selecter in the structure illustrated in FIG. 3.

In the present embodiment, the image number setting switch 92 is arranged so that any one of the numbers 2, 3, 4 and 6 is selected as the number of colour separation images to be produced. The memory selector 86 is disposed to equally divide the storage area of the memory unit 32 into storage sections of a number corresponding to the image number selected by the image number setting switch 92. The circuit structure of the memory selector 86 is illustrated in detail in the circuit diagram of FIG. 4. In FIG. 4, $M_1$ to $M_{12}$ represent storage blocks formed by equally dividing the storage area of the memory unit 32. In ordinary colour scanners, the limited numbers of 1, 2, 3, 4, 6 and 12 are used as the number of images to be produced in most cases. Accordingly, if the storage area is equally divided by twelve, which is the least common multiple of these numbers, and the resulting twelve storage blocks are appropriately combined, storage sections in the number corresponding to the number of images to be produced can be formed. Based on this concept, the memory selector 86 of the present embodiment is constructed so that it includes gates for combining the storage blocks $M_1$ to $M_{12}$ of the memory unit 32 according to the selected number of images to be produced. In FIG. 4, reference numeral 104 represents connection lines including six channels $CH_1$ to $CH_6$, each of which has a line of eight bits, connected to the input buffer 84 shown in FIG. 3. Reference symbols $G_1$ to $G_{21}$ represent AND gates, and one input terminal of each of these AND gates $G_1$ to $G_{21}$ is connected to any one of the channels $CH_1$ to $CH_6$ through a connection line of eight bits and the other input terminal of each of the AND gates $G_1$ to $G_{21}$ is connected to the corresponding bit of the register 88.

Figure 5:
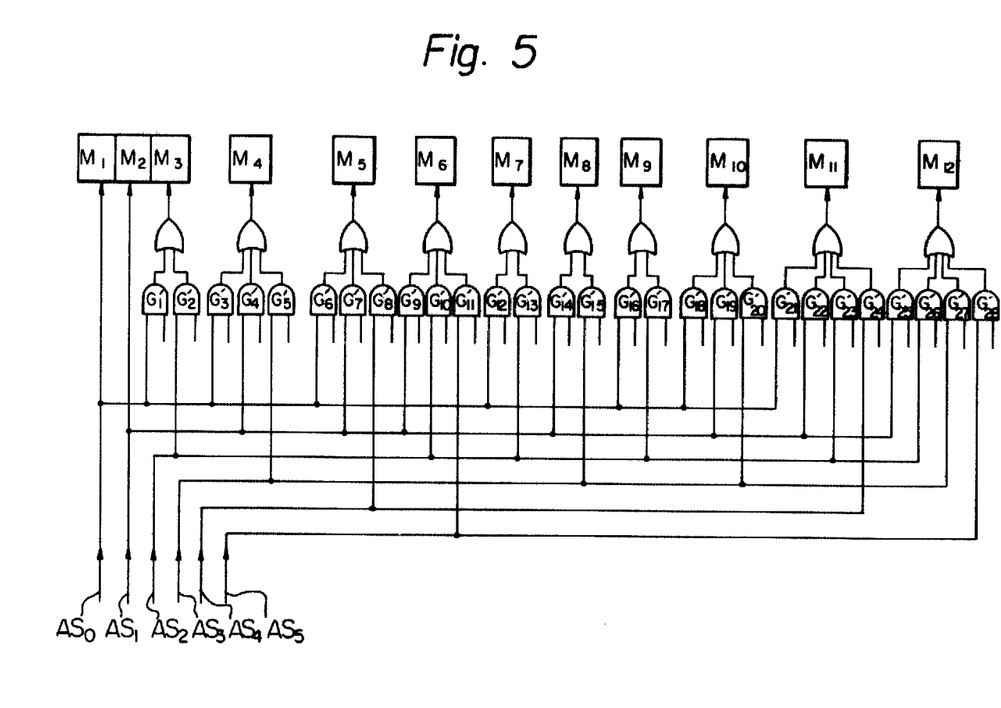
FIG. 5 is a circuit diagram illustrating in detail the storage area selection gate in the structure illustrated in FIG. 3.

When an operator sets a desired image number by the image number setting switch 92, the CPU 90 feeds control data as shown in Table 1 to the respective bits of the register 88.

sent AND gates. One input terminal of each of these AND gates $G'_1$ to $G'_{28}$ is connected to any one of the output lines $AS_0$ to $AS_5$ of the decoder 108 and the other input terminal of each of these AND gates $G'_1$ to $G'_{28}$ is connected to the output terminal of the corresponding bit of the register 98. When the image number is set by the image number setting switch 92, the CPU

TABLE 1

| Number of Images to be Produced | BIT NUMBER OF THE REGISTER 88 | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| 2 | 1 | 0 | 1 | 1 | 1 | 0 | 0 | 1 | 0 | 0 | 1 | 0 | 0 | 1 | 0 | 0 | 0 | 1 | 0 | 0 | 0 |
| 3 | 1 | 0 | 1 | 0 | 0 | 1 | 0 | 1 | 0 | 0 | 0 | 1 | 0 | 0 | 1 | 0 | 0 | 0 | 1 | 1 | 0 |
| 4 | 1 | 0 | 0 | 1 | 1 | 1 | 0 | 0 | 1 | 0 | 0 | 1 | 0 | 0 | 0 | 1 | 0 | 0 | 1 | 1 | 0 |
| 6 | 0 | 1 | 0 | 1 | 0 | 0 | 1 | 0 | 0 | 1 | 0 | 0 | 1 | 0 | 0 | 0 | 1 | 0 | 0 | 0 | 1 |

Bit numbers 1 to 21 of the register 88 correspond to the AND gates $G_1$ to $G_{21}$, to which the bits 1 to 21 of

90 feeds control data as shown in Table 2 to the respective bits of the register 98.

TABLE 2

| Number of Images to be Produced | BIT NUMBER OF THE REGISTER 98 | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 2 | 0 | 1 | 0 | 0 | 1 | 0 | 0 | 1 | 0 | 0 | 1 | 1 | 0 | 1 | 0 | 0 | 1 | 0 | 0 | 1 | 0 | 0 | 0 | 1 | 0 | 0 | 0 | 1 |
| 3 | 0 | 1 | 0 | 0 | 1 | 1 | 0 | 0 | 1 | 0 | 0 | 0 | 1 | 0 | 1 | 1 | 0 | 0 | 1 | 0 | 0 | 0 | 1 | 0 | 0 | 0 | 1 | 0 |
| 4 | 0 | 1 | 1 | 0 | 0 | 0 | 1 | 0 | 0 | 1 | 0 | 1 | 0 | 0 | 1 | 1 | 0 | 0 | 0 | 1 | 0 | 0 | 0 | 1 | 0 | 0 |
| 6 | 1 | 0 | 0 | 1 | 0 | 1 | 0 | 0 | 1 | 0 | 0 | 1 | 0 | 1 | 0 | 1 | 0 | 0 | 1 | 0 | 1 | 0 | 0 | 0 | 1 | 0 | 0 | 0 | the resistor 88 are connected, respectively. Accordingly, if a number of six is selected as the image number, the AND gates $G_2$, $G_4$, $G_7$, $G_{10}$, $G_{13}$, $G_{17}$ and $G_{21}$ are opened, and therefore, the storage sections corresponding to the channels $CH_1$, $CH_2$, $CH_3$, $CH_4$, $CH_5$ and $CH_6$ are the storage blocks $M_1$ and $M_2$, the storage blocks $M_3$ and $M_4$, the storage blocks $M_5$ and $M_6$, the storage blocks $M_7$ and $M_8$, the storage blocks $M_9$ and $M_{10}$, and the storage blocks $M_{11}$ and $M_{12}$, respectively.

As illustrated in FIG. 3, the writing control unit 94 comprises a writing address counter 106, a decoder 108 connected to the upper bit portion of the address counter 106, an area select gate 110 for selecting the storage block to be accessed among the storage blocks $M_1$ to $M_{12}$ according to the output of the decoder 108 and the control data set at the respective bits of the register 98, and a writing gate 112.

The writing address counter 106 is reset by the reset pulses RP supplied via a line 82 and is counted up in response to the input sampling pulses ISP supplied via a line 114.

The lower bit portion of the address counter 106 is connected commonly to the address inputs of the storage blocks $M_1$ to $M_{12}$ of the memory unit 32 through the writing gate 112 and an address bus 116. The bit number of the lower bit portion of the address counter 106 is selected so that the counted value becomes equal to the number of words in the respective storage blocks $M_1$ to $M_{12}$ of the memory unit 32. Accordingly, in the lower bit portion of the address counter 106, common addresses for the storage blocks $M_1$ to $M_{12}$ of the memory unit 32 are repeatedly generated from the lowermost address to the uppermost address. The decoder 108 decodes the output value of the upper bit portion of the address counter 106, and the output of the decoder 108 is put into the area select gate 110.

FIG. 5 is a detailed circuit diagram of the area select gate 110. In FIG. 5, $M_1$ to $M_{12}$ represent respective storage blocks of the memory unit 32. In the embodiment illustrated in FIG. 5, $AS_0$ to $AS_5$ represent six output lines of the decoder 108, and $G'_1$ to $G'_{28}$ repre- Bit numbers 1 to 28 of the register 98 correspond to the AND gates $G_1'$ to $G_{28}'$, respectively. Accordingly, for example, if a number of six is selected as the desired image number, the AND gates $G_1'$, $G_4'$, $G_6'$, $G_9'$, $G_{12}'$, $G_{14}'$, $G_{16}'$, $G_{19}'$, $G_{21}'$ and $G_{25}'$ are opened. Therefore, if the decoder output is developed on the output line $AS_0$ of the decoder 108, the storage blocks $M_1$, $M_3$, $M_5$, $M_9$ and $M_{11}$ of the memory unit 32 are kept accessible. On the other hand, if the decoder output is developed on the output line $AS_1$, the storage blocks $M_2$, $M_4$, $M_6$, $M_8$, $M_{10}$ and $M_{12}$ of the memory unit 32 are kept accessible. Accordingly, when the writing address counter 106 initiates the counting operation, the storage blocks $M_1$, $M_3$, $M_5$, $M_7$, $M_9$ and $M_{11}$ are accessed from the lowermost addresses thereof, and when the uppermost addresses of these storage blocks $M_1$, $M_3$, $M_5$, $M_7$, $M_9$ and $M_{11}$ are accessed, a carry output is fed from the address counter 106 to the decoder 108 and thus the decoder output appears on the output line $AS_1$. As a result, the storage blocks $M_2$, $M_4$, $M_6$, $M_8$, $M_{10}$ and $M_{12}$ are accessed from the lowermost addresses to the uppermost addresses and thus the writing operation is performed.

As shown in FIG. 3, the reading control unit 96 comprises a reading address counter 118, a decoder 120 connected to the upper bit portion of the address counter 118 and a reading gate 122.

The reading address counter 118 is reset by the reset pulses RP supplied via a line 82 and is counted up in response to the output sampling pulses OSP supplied via a line 124. The lower bit portion of the address counter 118 is connected commonly to the address inputs of the storage blocks $M_1$ to $M_{12}$ of the memory unit 32 through the reading gate 122 and an address bus 116. The bit number of the lower bit portion of the reading address counter 118 is equal to the bit number of the lower bit portion of the writing address counter 106. Accordingly, also the lower bit portion of this reading address counter 118 repeatedly generates common addresses of the storage blocks $M_1$ to $M_{12}$ of the memory unit 32 from the lowermost addresses to the uppermost addresses of the respective storage blocks $M_1$ to $M_{12}$. The decoder 120 decodes the output value of the upper bit portion of the address counter 118, and the respective decoder outputs are supplied in sequence to enable terminals of the storage blocks $M_1$ to $M_{12}$ of the memory unit 32 via the reading gate 122. Accordingly, when the reading address counter 118 initiates the counting operation, the storage block $M_1$ of the memory unit 32 is first made accessible and all the addresses of this block $M_1$ are accessed from the lowermost address to the uppermost address. Then, a carry output is fed from the upper bit portion of the address counter 118 to the decoder 120 and is decoded, whereby the storage block $M_2$ is made accessible. Therefore, all the addresses of the block $M_2$ are accessed in sequence from the lowermost address to the uppermost address thereof. In the same manner, the addresses of the subsequent storage blocks $M_3$ to $M_{12}$ are accessed one by one, and the reading operation is thus performed throughout the entire storage area of the memory unit 32.

The writing gate 112 and reading gate 122 are opened or closed by writing enable signals and reading enable signals supplied from the timing control circuit 102 via lines 126 and 128, respectively, so that writing and reading access is not simultaneously caused to the memory unit 32.

Figure 6:
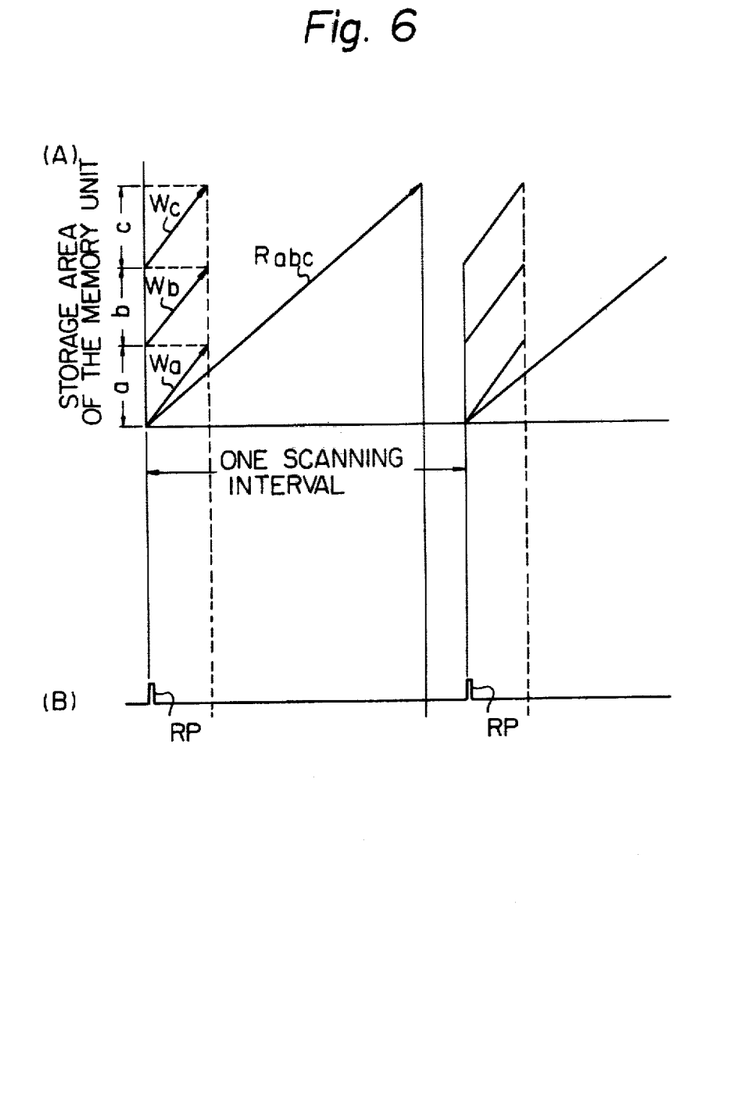
FIG. 6 is a time chart illustrating the operations of writing data in the memory unit and reading out the data therefrom in the method of the present invention.

FIG. 6 is a time chart illustrating the operations of writing data in the memory unit and reading out the data therefrom in the method of the present invention. The case where a number of three is selected as the number of images to be produced is illustrated in FIG. 6. In FIG. 6-(A), the ordinate indicates the storage area of the memory unit, and a, b and c represent storage sections formed by equally dividing the storage area of the memory unit into three sections of the same capacity. FIG. 6-(B) represents reset pulses RP. When a reset pulse RP is generated, data of respective images to be produced in a quantity corresponding to one scanning line are simultaneously written in the divided storage sections a, b and c in parallel, as indicated by Wa, Wb and Wc from the point of generation of this reset pulse RP. On the other hand, the written data are read out in sequence in series, as indicated by Rabc, from the point of generation of the reset pulse RP. Thus, data of images in a quantity corresponding to one scanning line are taken out during a period of one scanning operation.

A circuit for forming input sampling pulses ISP and output sampling pulses OSP will now be described.

Figure 7:
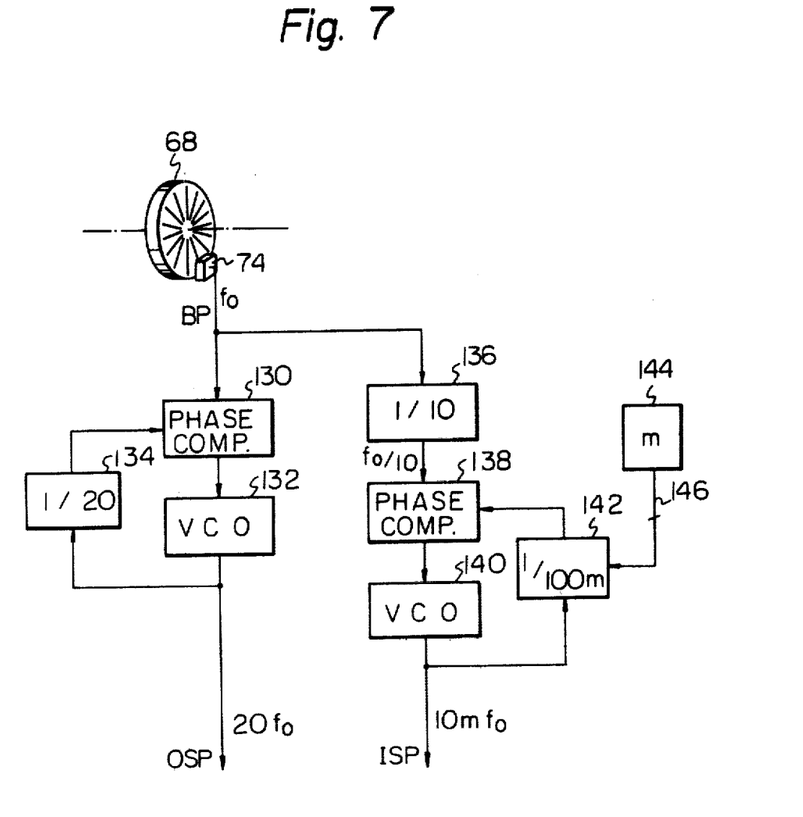
FIG. 7 is a block diagram illustrating one embodiment of the structure of the circuit for forming input sampling pulses and output sampling pulses in the embodiment illustrated in FIG. 1.

FIG. 7 illustrates one embodiment of the structure of a circuit for forming the sampling pulses ISP and OSP. The basic pulse BP obtained from the opto-electrical sensor 74, described hereinbefore with respect to FIG. 2, has a basic frequency $f_O$ proportional to the scanning speed in the scanning line direction. The frequency of the basic pulse BP is increased by twentyfold by a phase lock loop circuit (PLL circuit) comprising a phase comparator 130, a voltage controlled oscillator 132 and a fixed divider 134 having a fixed dividing ratio of 1/20 and is thus converted to an output sampling pulse OSP. Accordingly, the frequency $f_{OSP}$ of the output sampling pulse OSP is 20 times as high as the basic frequency $f_O$. Furthermore, the frequency of the basic pulse BP is reduced to 1/10 by a fixed divider 136 having a fixed dividing ratio of 1/10. Moreover, the frequency of the output pulse of the fixed divider 136 is increased by 100 m times by a phase lock loop circuit (PLL circuit), comprising a phase comparator 138, a voltage controlled oscillator 140 and a programable variable divider 142 having a variable dividing ratio of 1/100 m, and is thus converted to an input sampling pulse ISP. Accordingly, the relation of $f_{ISP}=10$ m $f_O=\frac{1}{2}$m $f_{OSP}$ is established among the basic frequency $f_O$, the frequency $f_{OSP}$ of the output sampling pulse OSP and the frequency $f_{ISP}$ of the input sampling pulse ISP. As described hereinbefore with reference to FIG. 2, the diameter of the exposing drum 46 is two times as large as the diameter of the analysing drum 40. Accordingly, if the relation of $f_{ISP}=\frac{1}{2}f_{OSP}$ is established between the frequency $f_{ISP}$ of the input sampling pulse ISP and the frequency $f_{OSP}$ of the output sampling pulse OSP, an image having a size equal to that of the original with respect to the scanning line direction can be reproduced. Therefore, the coefficient m indicates the ratio of enlargement or reduction. This enlargement or reduction ratio m is given to the programable variable divider 142 from an enlargement or reduction ratio setting mechanism 144 via a line 146. As illustrated in FIG. 3, this mechanism 144 comprises an enlargement or reduction ratio setting switch 148 and the CPU 90. When the enlargement or reduction ratio m is set by the setting switch 148, the CPU 90 sets a value corresponding to the ratio m at the programable variable divider 142 via a line 146 and, also sets a value corresponding to the ratio m at the speed control circuit 58, illustrated in FIG. 2, via the line 60, so as to control the enlargement or reduction ratio in the frame direction.

Figure 8:
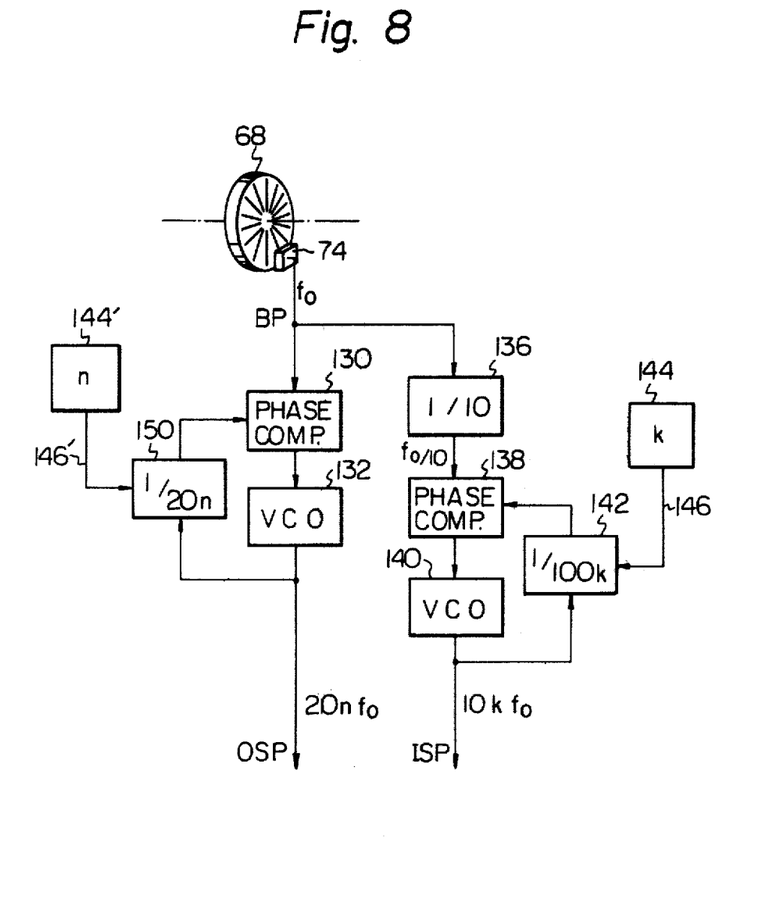
FIG. 8 is a block diagram illustrating another embodiment of the structure of the circuit for forming input sampling pulses and output sampling pulses.

Another embodiment of the structure of the circuit for forming sampling pulses ISP and OSP is illustrated in FIG. 8.

The structure of the sampling pulse forming circuit illustrated in FIG. 8 is the same as the structure of the sampling pulse forming circuit illustrated in FIG. 7, except for the following point. In the sampling pulse forming circuit illustrated in FIG. 8, a programable variable divider 150 having a variable dividing ratio of 1/20n is disposed in the PPL circuit for forming output sampling pulses OSP, whereas the fixed divider 134 is disposed in the sampling pulse forming circuit illustrated in FIG. 7. Accordingly, the frequencies of both the input sampling pulse ISP and output sampling pulse OSP are variable in the sampling pulse forming circuit illustrated in FIG. 8. The coefficient n given to the programable variable divider 150 is supplied from an enlargement or reduction ratio setting mechanism 144' via a line 146'. As well as the ratio setting mechanism 144 described above, this ratio setting mechanism 144' comprises an enlargement or reduction ratio setting switch 148, the CPU 90 and a programable read-only memory (P. ROM) 152, as illustrated in FIG. 3. When the enlargement or reduction ratio m is set by the switch 148, the CPU 90 determines the coefficients k and n according to the set ratio m so that a relation of $f_{ISP}=\frac{1}{2}$m $f_{OSP}$ is established between the frequencies $f_{ISP}$ and $f_{OSP}$ of the sampling pulses ISP and OSP. If the relation of $f_{ISP} \geq f_{OSP}$ is established at this point, that is, if m is equal to two or larger than two because one scanning length on the exposing side is two times as large as one scanning length on the analysing side in the present embodiment, the frequencies $f_{ISP}$ and $f_{OSP}$ are determined so that the number of output sampling pulses OSP generated during one scanning operation in the scanning line direction is equal to the total number of words in the available storage area of the memory unit 32. Contrary to this, in case of $f_{ISP}<f_{OSP}$, that is, m<2 in the present embodiment, the frequencies $f_{ISP}$ and $f_{OSP}$ are determined so that the number of the input sampling pulses ISP generated during one scanning operation in the scanning line direction is equal to the total number of words in the available storage area of the memory unit 32. The coefficients k and n for maintaining the above relations according to the set ratio m are preliminarily stored in the programable read-only memory 152. As well as in the embodiment illustrated in FIG. 7, when the enlargement or reduction ratio m is thus set, also the enlargement or reduction ratio in the frame direction is controlled by the speed control circuit 58 illustrated in FIG. 2, in the embodiment illustrated in FIG. 8.

When enlargement or reduction of the original is carried out by using the sampling pulse forming circuit illustrated in FIG. 8, the available storage area of the memory unit 32 can be entirely accessed, and therefore, the storage capacity can be effectively utilized and a reduced or enlarged image having a high picture element density can be obtained. The reason for this will now be described with reference to FIGS. 9 and 10.

Figure 9:
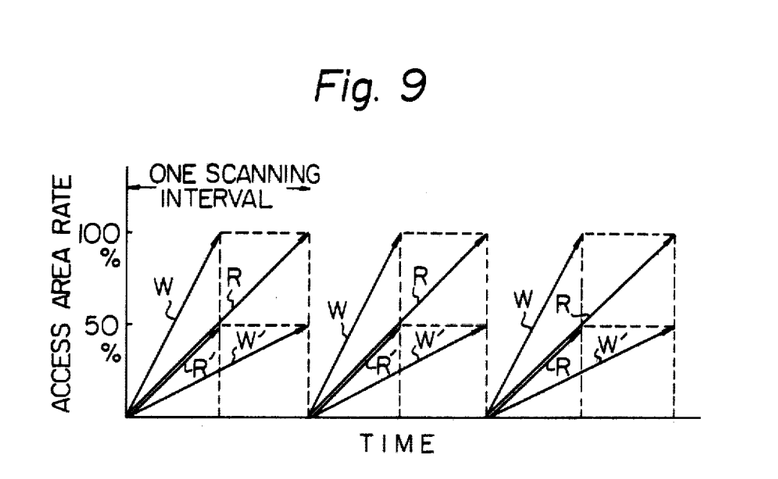
FIGS. 9 and 10 are diagrams illustrating relations of the speed of writing data into the memory unit and the speed of reading out the data therefrom to the area utilization ratio in the memory unit.
Figure 10:
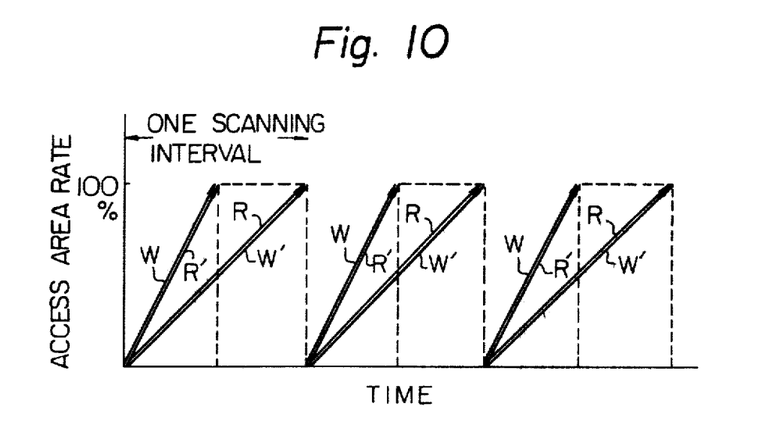

In FIGS. 9 and 10, the abscissa indicates the time and the ordinate indicates the ratio of the actually accessed area to the entire available storage area of the memory unit. For affording a better understanding, in FIGS. 9 and 10, the case where the length of a scanning line on the exposing side is equal to the length of a scanning line on the analysing side and the operation of writing data in the memory unit is performed in series, that is, one image is to be produced, is illustrated.

When the frequency $f_{OSP}$ of the output sampling pulses OSP is fixed at a certain value as in the sampling pulse forming circuit illustrated in FIG. 7, the speed of reading out the data from the memory unit 32 is kept constant as indicated by R and R' in FIG. 9. Accordingly, no problem is caused when an enlarged image is formed, but in the case where a reduced image is formed, since the number of words accessed during one scanning operation is determined by the writing speed W', all the available storage area cannot entirely be utilized. However, when the sampling pulse forming circuit as illustrated in FIG. 8 is used, as shown in FIG. 10, the reading speed R for enlargement and the writing speed W' for reduction are selected so that all the words of the available storage area can be accessed. Therefore, effective utilization of the storage capacity becomes possible.

Figure 11:
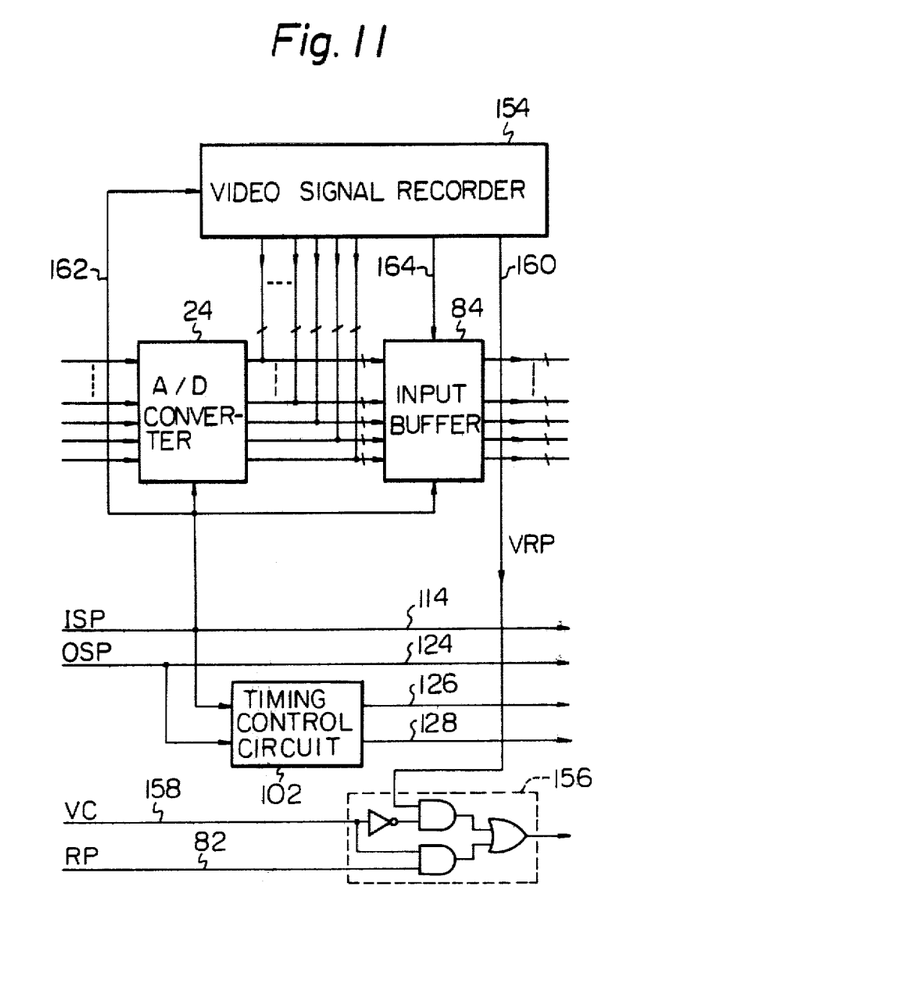
FIG. 11 is a block diagram illustrating the structure of a part of another embodiment of the present invention.

As will be apparent from the foregoing description of an embodiment, the method of the present invention can be applied to an apparatus for forming images by using image signals obtained directly from the analysing scanner. The method of the present invention can also be applied to an apparatus for forming images by using digital image signals recorded in advance in a video signal recorder. FIG. 11 is a circuit diagram illustrating a part of the apparatus of the latter type. The structure of a part not illustrated in FIG. 11 is the same as the structure illustrated in FIG. 3. In FIG. 11, reference numerals 154 and 156 represent a video signal recorder and a video control circuit, respectively. When a plurality of images are formed by using digital image signals from the video signal recorder 154, low-level video control signals VC are applied via a line 158, whereby the video control circuit 156 is actuated and, instead of the above-mentioned reset pulse RP supplied via the line 82, a reset pulse VRP for one rotation of the video signal recorder 154 is supplied to the writing address counter 106 and reading address counter 118, illustrated in FIG. 3, via a line 160 from the video signal recorder 154. On the other hand, the input sampling pulse ISP is supplied to the video signal recorder 154 via a line 162 and a digital image signal is transmitted to the input buffer 84 synchronously with this sampling pulse ISP. In this case, the input buffer 84 is synchronous with the input sampling pulse ISP and the writing timing is controlled by a video synchronous signal applied via a line 164. Other operation of the apparatus illustrated in FIG. 11 is the same as in the apparatus illustrated in FIG. 3.

The foregoing embodiments are directed to the method of forming a plurality of colour separation images from one coloured original. As will readily be understood from the foregoing illustration, the method of the present invention can also be applied to the case where a plurality of images of the same colour are formed from one original or a plurality of originals.

As many widely different embodiments of the present invention may be constructed without departing from the sprit and scope of the present invention, it will be understood that the present invention is not limited to the specific embodiments described in this specification, except as defined in the appended claims.

What is claimed is:

1. A method of producing a plurality of colour component separations from a plurality of digital colour component signals which indicate colour component densities of a coloured original, respectively, each of the digital colour component signals being composed of picture element signals derived from opto-electrically scanning one line of the original, comprising the steps of:

selecting a number of colour component separations to be produced;

dividing an available storage area of a single store into a number of storage sections of equal storage capacity equal to the number of colour component separations;

producing first timing pulses having a first frequency;

simultaneously storing, in parallel, each of the digital colour component signals corresponding to the said scanned line of the coloured original in one of the said storage sections, the storage of the picture element signals of each of the digital colour component signals being under the control of said first timing pulses;

producing second timing pulses having a second frequency;

serially extracting the digital colour component signals from the store by sequentially accessing all of the available storage area regardless of the storage sections, the extraction of the picture element signals of the said digital colour component signals being under the control of said second timing pulses;

progressively treating a line of an output surface in accordance with the digital colour component signals extracted from the store, to form a sequence of colour component separations of one scanned line of the original along the direction of the scanning line; and continuously repeating the above steps from the storing step to the treating step until all lines of the output surface are treated.

2. A method as claimed in claim 1, wherein said dividing step includes the steps of:

previously dividing an entire available storage area of said store into a plurality of minor storage blocks which have equal storage capacities, and;

combining the same number of said minor storage blocks to form each of said storage sections.

3. A method as claimed in claim 1, wherein said storing step includes the steps of:

distributing each one of said digital colour component signals to be stored to said respective storage sections, and;

sequentially accessing the entire storage area in each of said storage sections to store each one of said digital colour component signals of one scanned line of said original, said accessing of all said storage sections being synchronized.

4. A method as claimed in claim 1, 2 or 3, wherein said first and second frequencies being proportional to a scanning speed, and establishing a ratio of said first frequency of said second frequency in accordance with a desired factor of image enlargement or image reduction.

5. A method as claimed in claim 4, wherein a relationship of said first frequency to the scanning speed is variably changed and a relationship of said second frequency to the scanning speed is fixed at a predetermined value.

6. A method as claimed in claim 4, wherein proportional ratios of said first and second frequencies to the scanning speed are variably changed, both said proportional rations being established so that the number of the one of said first timing pulses and said second timing pulses having a frequency lower, generated during a period of one scanning operation, corresponds to the entire available storage capacity of said store.

7. In a scanning apparatus for producing multiple images from multiple digital image signals which are obtained by opto-electrically scanning at least one original, one of said multiple digital image signals being composed of plural picture element signals in one scanning line of said original, a method of producing multiple images comprising, the steps of:

dividing an available whole storage area of a store into multiple storage sections which have an equal storage capacity, respectively, a number of said multiple storage sections being equal to the number of said multiple images to be produced;

producing first timing pulses having a first frequency;

simultaneously storing, in parallel manner, each one of said multiple digital image signals of one scanned line of said original in said respective multiple storage sections, the storing operation of the plural picture element signals of each said multiple digital image signals responding to said first timing pulses;

producing second timing pulses having a second frequency;

extracting, in series, said digital image signals from said store by sequentially accessing all of said available storage area regardless of said storage sections, the extracting operation of the plural picture element signals of said digital image signals responding to said second timing pulses;

electro-optically treating, in sequence, a line of an output surface in accordance with said multiple digital image signals extracted from said store, to form multiple images of one scanned line of said original along a direction of the scanning line;

said first and second frequencies being variably changeable and related to a scanning speed;

establishing a ratio of said first frequency to said second frequency in accordance with a desired factor of image enlargement or image reduction;

controlling a ratio of said first and second frequencies to a scanning speed so that the number of the one of said first timing pulses or said second timing pulses having a lower frequency generated during a period of one scanning operation, corresponds to the entire available storage capacity of said store; and continuously repeating the sequence steps from said storing step to said treating step until all lines of said output surface are treated.

* * * * *